United States Patent [19]
Walker

[11] Patent Number: 5,273,748
[45] Date of Patent: Dec. 28, 1993

[54] THEFT PREVENTION DEVICE

[76] Inventor: Kenneth R. Walker, 3932 N. Peardale Dr., Lafayette, Calif. 94549

[21] Appl. No.: 497,125

[22] Filed: Mar. 21, 1990

[51] Int. Cl.$^5$ ............................................. A01N 25/34
[52] U.S. Cl. .................................. 424/402; 150/166; 424/10
[58] Field of Search ...................... 424/403, 10; 512/4, 512/5; 296/136

[56] References Cited

U.S. PATENT DOCUMENTS

| | | | |
|---|---|---|---|
| 125,173 | 4/1872 | Coddington | 424/447 |
| 1,029,105 | 7/1911 | Clarke | 512/4 |
| 2,171,701 | 6/1937 | Howett | 424/10 |
| 4,355,839 | 10/1982 | Rosen | 150/166 |
| 4,938,522 | 7/1990 | Herron | 296/136 |
| 5,155,848 | 5/1992 | Malone | 150/166 |

FOREIGN PATENT DOCUMENTS 2167719  6/1986  United Kingdom .

Primary Examiner—Thurman K. Page
Assistant Examiner—D. Gabrielle Phelan

[57] ABSTRACT

A theft prevention device, particularly useful for discouraging theft of hood ornaments and other articles on the exteriors of automobiles, includes a bag or pouch of fabric material. The bag is sized to fit over the article to be protected, and may have a drawstring at its neck to enable it to tightly engage the article. In one embodiment an oily liquid material is soaked into the bag, such that anyone seeking to tamper with the protected article will touch the bag and make contact with the liquid material. The liquid material contains a strong skin irritant which does not injure the skin but which causes a burning sensation on the hands of the attempted thief. On the outside of the bag there may be printed a warning to discourage thieves from even attempting theft of the bag's contents. In another embodiment the bag includes a liquid reservoir which squirts a liquid at an intended thief when the bag is grabbed by the thief. The liquid in the reservoir may be a fragrance oil with a very obnoxious and lasting odor.

16 Claims, 3 Drawing Sheets

THEFT PREVENTION DEVICE

BACKGROUND OF THE INVENTION

This invention is concerned with prevention of theft, and more particularly with deterring the theft of hood ornaments of automobiles and even of an automobile itself.

Theft of automobiles, and theft of exterior components of automobiles, have reached alarming proportions in recent years. In particular, hood ornaments bearing automobile logos have been a favorite target for thieves and vandals. The distinctive hood ornaments, such as on Mercedes-Benz and Cadillac automobiles, are easily removed by quickly breaking them off. In fact, these very expensive and easily removed emblems are considered collectors, items among some petty thieves in the United States and elsewhere in the world. Thousands of these hood ornaments may be stolen on a given day.

Owners of expensive automobiles bearing these expensive hood ornament articles tire of replacing them and have sought some effective form of deterrent. None has been available. A removable hood ornament for some relatively recent Mercedes-Benz models was ill-fitting and expensive.

SUMMARY OF THE INVENTION

This invention provides an effective theft deterrent particularly for hood ornaments or emblems of vehicles, but also for other articles on the exterior or interior of a vehicle.

In one embodiment of the invention, the theft deterrent device is of a type which will cause fear and anxiety in a thief. In this embodiment, a small fabric pouch or bag is provided to fit over the hood emblem or other article to be protected. Into the outside surface of this pouch or bag is added a liquid, preferably an oily liquid, which will cause severe skin irritation or burning of the hands with contact. In addition, a prominent warning label preferably is displayed on the outside of the pouch, advising prospective thieves of the danger of skin irritation or burning if the device is contacted. The pouch preferably is a cloth bag, such as of velveteen, cotton, wool or velour fabric, which is absorbent and can hold an oily liquid for about 24 hours without completely drying, and the pouch may have a drawstring for engaging it about the article to be protected.

Although the theft deterrent device of the invention will not absolutely prevent the theft of a protected article, it provides a strong deterrent. A potential thief unfamiliar with the device should be deterred by the warning on the pouch. Even if the warning is not preventive, the thief will encounter the strong burning sensation either while still engaged in removing the article or shortly afterward, and this should discourage him from repeating the act on another vehicle.

For handling of the theft prevention bag, the owner of the vehicle merely need use a plastic bag or wear a rubber or plastic glove, which will not be penetrated by the oily irritating liquid.

The skin irritating liquid used in accordance with the invention may be a harmless food-type product, either oily in itself or in an oily carrier. For example, the product cayenne pepper extract may be used. Although causing temporary severe skin irritations on most persons, this product does not cause any actual injury and its effects eventually dissipate. In the context of this invention, the product can cause fear and anxiety in a thief, discouraging him from completing the act of theft, or from repeating the act of theft.

In another embodiment of the invention, a very strong fragrance oil with an offensive, obnoxious and lasting stench is used in lieu of the skin irritant. This liquid will leave a lasting and very noticeable odor on the thief for at least several hours. The fragrance oil can be added to the same type of cover device described above, but it is more preferably used in connection with a cover pouch structured slightly differently. The cover pouch preferably has a pocket to go over the article (e.g. the hood ornament) and a separate liquid reservoir on the front of the pocket, for containing the malodorous liquid. At an upper position on the liquid reservoir is a squirter opening which will squirt or spray the liquid at the thief when he grabs the cover device in an attempt to remove it from the article.

It is therefore among the objects of the present invention to provide an effective theft deterrent for relatively small articles, particularly vulnerable articles on the exterior of an automobile. The device and method of the invention can also be effective in deterring the theft of the entire vehicle, such as when placed on the gear shift or transmission selector lever of the automobile. These and other objects, advantages and features of the invention will be apparent from the following description of preferred embodiments, considered along with the accompanying drawings.

DESCRIPTION OF PREFERRED EMBODIMENT

Figure 1:
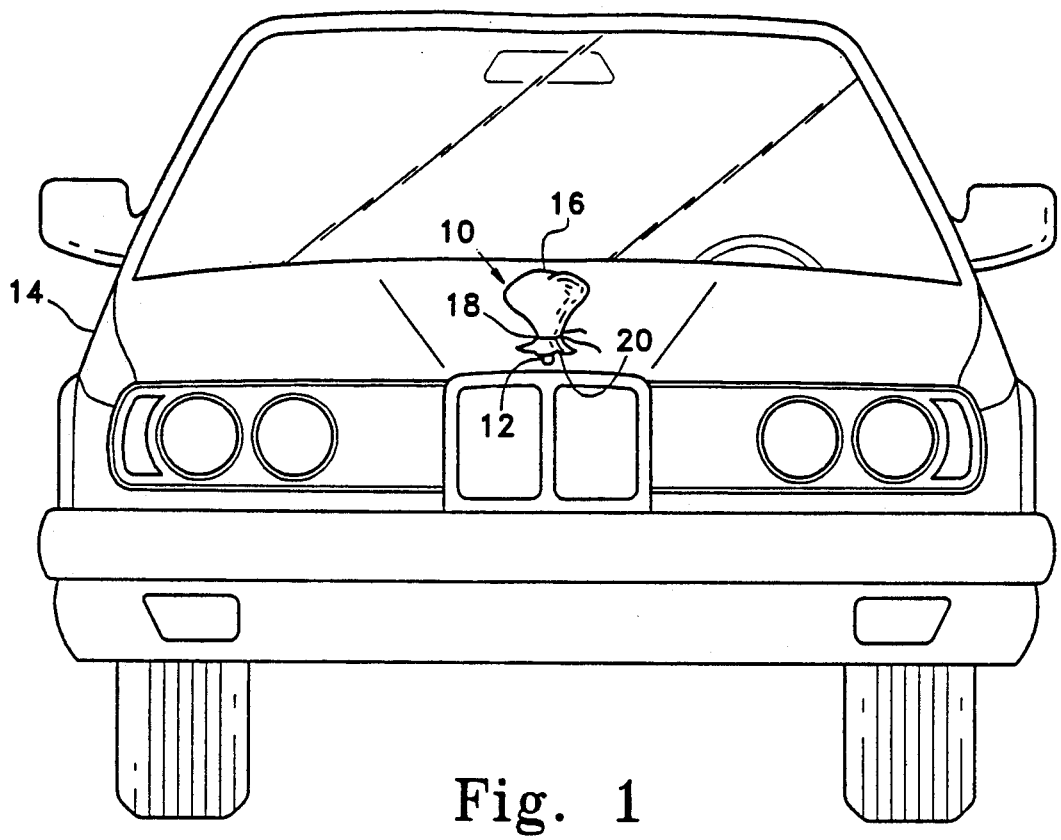
FIG. 1 is a view in perspective showing the front of an automobile having a hood emblem or ornament covered and protected by the device of the invention.
Figure 2:
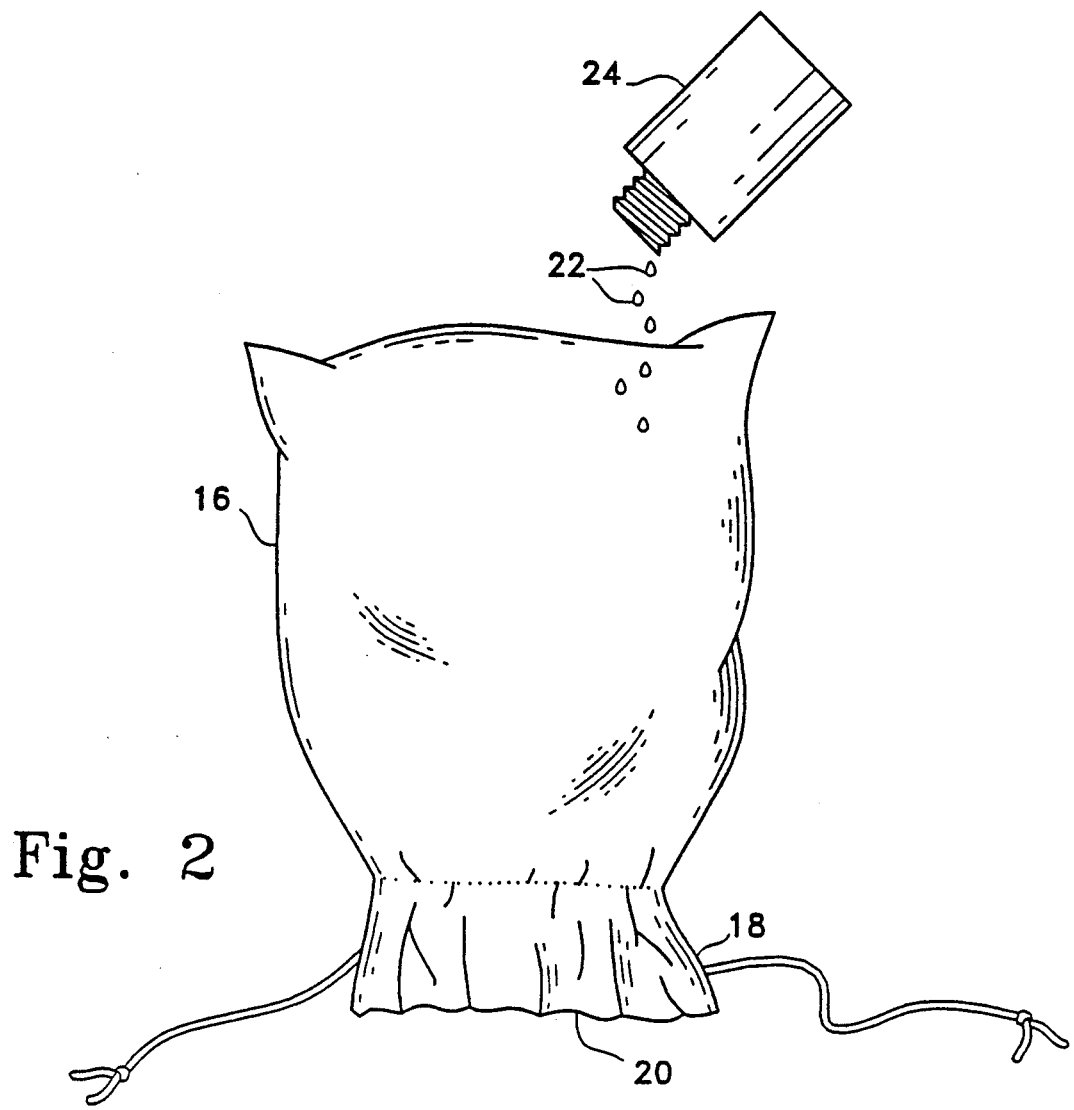
FIG. 2 is a view in perspective showing a pouch to which a liquid skin irritant is added, in accordance with the principles of the invention.

In the drawings, FIG. 1 shows a theft prevention or deterrent device 10 for relatively small articles in accordance with one embodiment of the invention, as installed over a hood ornament 12 of an automobile 14. The theft prevention device comprises a cover means for engaging over the hood ornament or other exterior article of the automobile to be protected, with the capability of absorbing and holding at its exterior a liquid skin irritant for deterring theft and vandalism against such articles or ornaments. In the embodiment illustrated, the theft deterrent device 10 comprises a small bag or pouch 16 as also seen in FIG. 2, made of an absorbent fabric, or at least having an exterior surface formed of an absorbent material. As illustrated, the pouch may have a drawstring closure 18, for drawing the mouth 20 of the bag down tightly over a base portion of the hood ornament or other protected article. This simple closure is advantageous for its simplicity and the opportunity for the user to avoid contact with the exterior of the pouch itself in making the closure;

however, other appropriate forms of closure or fasteners can be used, such as Velcro, snap fasteners, etc.

FIG. 2 shows drops of a liquid skin irritant 22 from a container 24 being applied to the exterior of the bag or pouch 16. This liquid material, as described above, preferably is oily or at least carried in an oily carrier, so as to remain in the exterior surface of the pouch for long periods of time without drying. The material may comprise cayenne pepper extract, a harmless food product, but one which tends to cause severe skin irritation on the hands after contact. More preferably the material used is oleoresin capsicum, African type, another product used in many types of food where a hot sensation is desired. One part of this product will generally replace about 10 parts of good grade cayenne pepper extract.

In most individuals coming into contact with these products, there is a period of delay before the burning sensation begins, usually between about two and ten minutes. This functions to discourage repeated tampering with automobile emblems or ornaments or other automotive articles covered with a similar theft deterrent pouch, and it can actually discourage a thief from completing removal of an article, if the burning sensation begins before he has finished.

Figure 3:
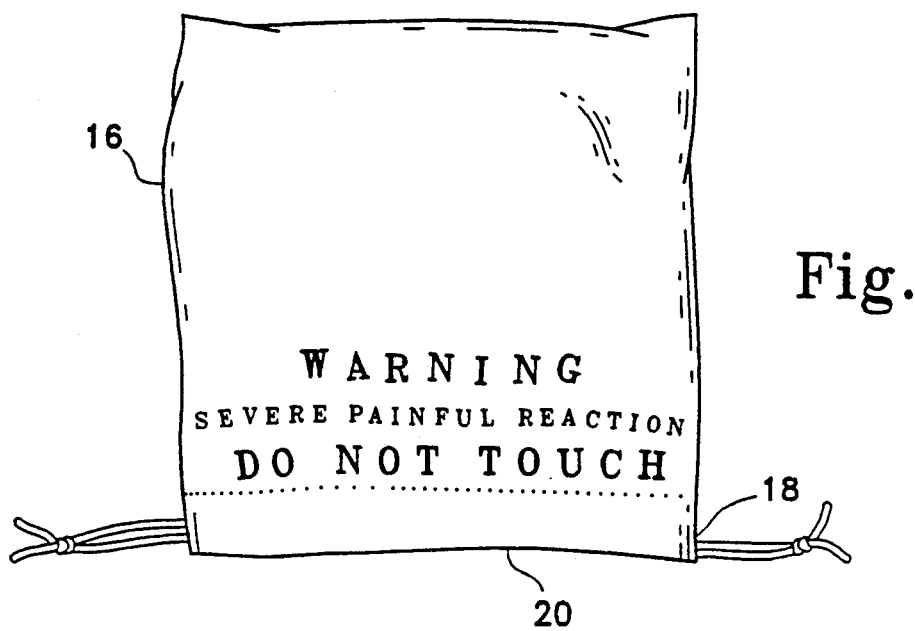
FIG. 3 is a view showing the pouch of FIG. 2 bearing a warning.

FIG. 3 shows an example of warning words which may be displayed on the theft deterrent device, in plain sight of a prospective thief. This warning in itself can save an automobile owner from losing his hood ornament or other exterior article to thievery. It is an important feature of a preferred embodiment of the invention, that a prominent warning of this nature be included on the surface of the device. It preferably is reflective so as to be seen at night.

For use of the theft deterrent device of the invention, the owner of the vehicle when leaving the vehicle exposed removes the pouch 16 from an appropriate storage place such as in a plastic bag in the glove compartment or trunk of the automobile. He then applies a few drops of the liquid material 22 from the container 24 to the exterior of the pouch, so that there is ample potency to the liquid deterrent on the pouch. Then, handling the pouch with a rubber glove or with the plastic bag, the automobile owner simply slips the pouch down over the hood ornament or emblem 12 on the automobile. The drawstring 18 is then drawn tight and a plastic bag, if used, is removed. Alternatively, the pouch 16 can be slipped over the hood ornament before the fresh liquid is added, and several drops of the liquid can be applied after the pouch is placed over and drawn tight onto the hood ornament or article.

Figure 6:
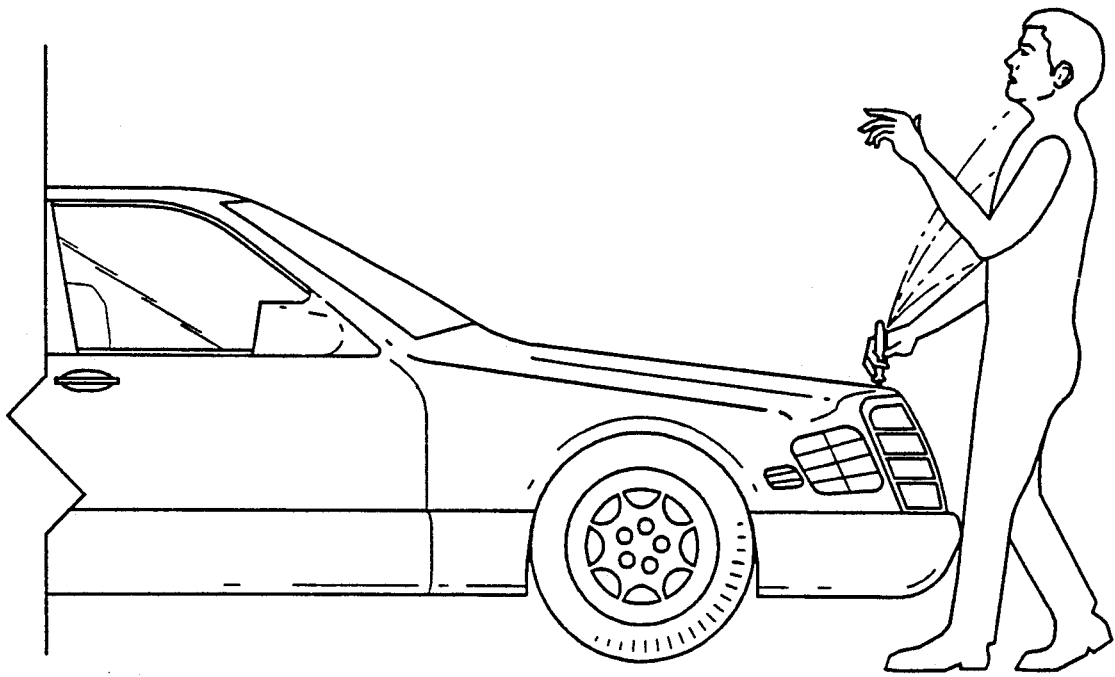
FIG. 6 is a side elevation view illustrating generally the use of the second embodiment of the invention.
Figure 4:
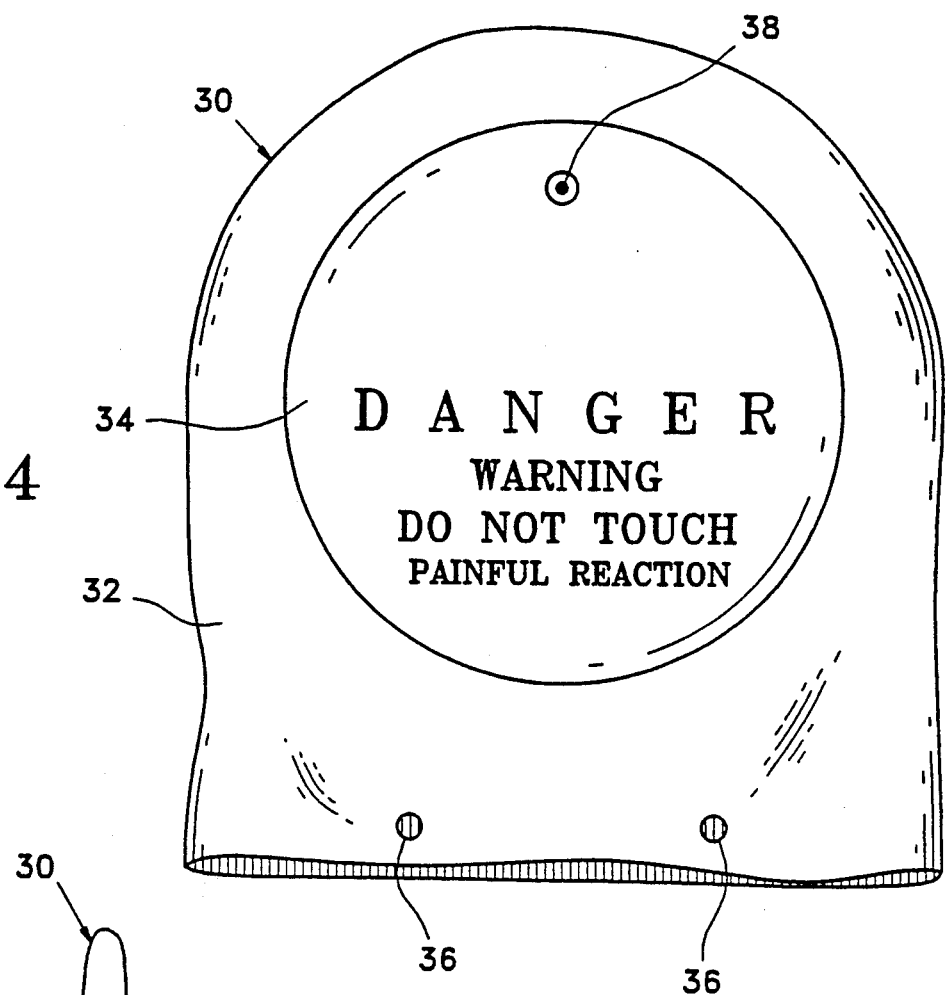
FIG. 4 is a front elevation view showing another embodiment of the invention.
Figure 5:
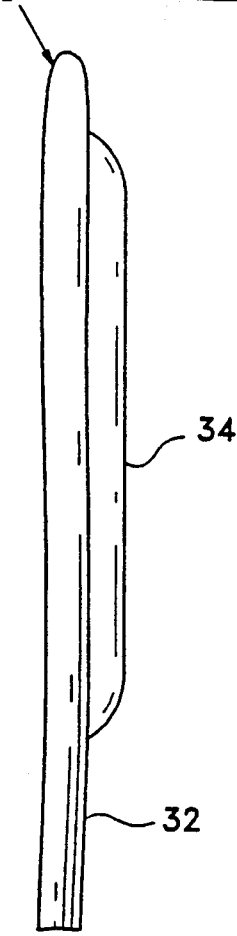
FIG. 5 is a side elevation view of the device shown in FIG. 4.

FIGS. 4, 5 and 6 illustrate another preferred embodiment of the present invention. In FIG. 4 a pouch 30 is shown, again sized to fit fairly closely over an article to be protected, such as a hood ornament of an automobile. The cover device 30 of this embodiment includes a pocket 32 and a liquid reservoir 34 which is mounted on the front of the pocket 32 and which comprises a separate space or plenum.

As shown in FIG. 4, the device 30 may have holes 36 near its lower edge for a drawstring such as shown in FIG. 2. Further, the cover device preferably has a warning such as illustrated on the front of the liquid reservoir 34.

As also shown in FIGS. 4 and 5, the liquid reservoir 34 has a squirter orifice 38 near its top, oriented to squirt liquid outwardly and upwardly. The theft deterrent liquid may be loaded into the liquid reservoir through this opening 38, preferably by a narrow eyedropper type of stem on a squeeze bottle (not shown) within which the theft deterrent liquid is sold. Any narrow spout will be adequate for introducing the liquid into the reservoir through the opening 38. Then, when someone attempting to steal the protected article grasps the cover device 30, his palm or thumb generally will be pressed hard against the liquid reservoir 34. This will squirt the contained liquid out of the squirter spout or orifice 38, directly at the intended thief. FIG. 6 diagrammatically indicates this event.

The orifice 38 preferably is small enough to form a very fine spray of the liquid, and it may include an atomizing structure to cause the liquid to be sprayed out in very fine droplets.

The embodiment illustrated in FIGS. 4, 5 and 6 is used particularly advantageously with a theft deterrent liquid which contains a very strong, pungent and obnoxious odor, one that creates an extremely strong and nauseating stench that will last for many hours. For example, such a liquid may comprise a fragrance oil distributed by Western Flavors and Fragrances, No. 5263-20, 51849-20, or 1850-20. Contact with a spray of one of these fragrance oils can be worse than a direct hit by a skunk, in potency and social reaction.

Such a stench is clearly something a prospective thief will want to avoid. This embodiment of the invention therefore will deter thievery of hood ornaments and similar articles in a manner similar to the first embodiment described above. In addition, the very strong odor present on a thief who has stolen a hood ornament can serve as an aid in apprehension of the thief and can help provide evidence useful in the prosecution of the thief.

It is also possible that the cover structure shown in FIGS. 4 and 5 can be used with the skin irritant liquid described above, or if desired, both types of theft deterrent liquid can be mixed together in the liquid reservoir 34. Alternatively, the liquid reservoir can contain one theft deterrent liquid, and the exterior of the pocket itself can be absorbent so as to carry either the same or the other liquid. For example, the reservoir can contain the pungent liquid, while the outside of the pocket fabric has the skin irritant soaked into it.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A device for discouraging theft of small articles, comprising,
   movable cover means in the form of a bag or pouch sized to fit onto the article, for generally covering an article when the article is to be protected,
   the cover means having means for carrying a liquid, at least on its outside surface, and
   a theft deterrent liquid placed on the cover means.

2. A device according to claim 1, wherein the theft deterrent liquid includes a strong skin irritant for causing a burning sensation on the skin of any person whose hands come in contact with the exterior of the cover means.

3. A device according to claim 2, wherein the theft deterrent liquid has the ingredient oleoresin capsicum, African type, as a skin irritant, carried in an oily carrier.

4. A device according to claim 1, wherein the cover means comprises a bag formed of liquid-absorbent fabric material.

5. A device according to claim 1, in combination with a hood ornament of an automobile, the cover means being engaged over the hood ornament to discourage its theft.

6. A device according to claim 1, wherein the cover means comprises a woven cotton fabric.

7. A device according to claim 2, wherein the cover means comprises a pouch capable of fitting over the article to be protected, and bearing a warning to prospective thieves as to the likelihood of severe pain upon the touching of the pouch.

8. A device according to claim 1, wherein the theft deterrent liquid includes a pungent, offensive fragrance which will leave a strong odor on anyone coming into contact with the liquid, lasting at least for several hours.

9. A device according to claim 8, wherein the pungent liquid comprises fragrance oil No. 1850-20.

10. A method for deterring theft of an article on a vehicle, comprising,
providing an absorbent pouch of a size capable of generally fitting over the article to be protected,
placing on the exterior of the absorbent pouch a theft deterrent liquid having a strong skin irritant, such that the liquid is absorbed at least partially into the surface of the pouch and is present substantially along the entire exterior of the pouch, and
placing the pouch with the theft deterrent liquid on the article of the vehicle.

11. The method of claim 10, wherein the article is a hood ornament on the vehicle.

12. The method of claim 10, wherein the article is a transmission shifting lever of the vehicle, whereby a thief who has entered the vehicle is deterred from taking the vehicle.

13. A device for discouraging theft of small articles, comprising,
movable cover means for generally covering an article when the article is to be protected,
the cover means including a pocket sized to fit over the article, and a separate liquid reservoir secured to the outside of the pocket, and
the liquid reservoir having a squirter nozzle means for squirting liquid contained in the liquid reservoir out of the nozzle means and toward a person when that person grips the cover means in an effort to remove the cover means from the article.

14. A device according to claim 13, wherein the liquid reservoir contains a theft deterrent liquid including a strong skin irritant for causing a burning sensation on the skin of any person coming in contact with the liquid.

15. A device according to claim 13, wherein the liquid reservoir contains a theft deterrent liquid including a pungent, offensive fragrance which will leave a strong odor on anyone coming into contact with the liquid, lasting at least for several hours.

16. A device according to claim 15, wherein the cover means further includes means for carrying a liquid, at least on its outside surface, and with a theft deterrent liquid placed on the cover means, including a strong skin irritant for causing a burning sensation on the skin of any person whose hands come in contact with the exterior of the cover means.

* * * * *